Sept. 22, 1959 S. A. COGSDILL 2,905,030
MICRO-LIMIT COUNTERSINK DRIVE WITH OVERRIDE
Filed Feb. 21, 1957
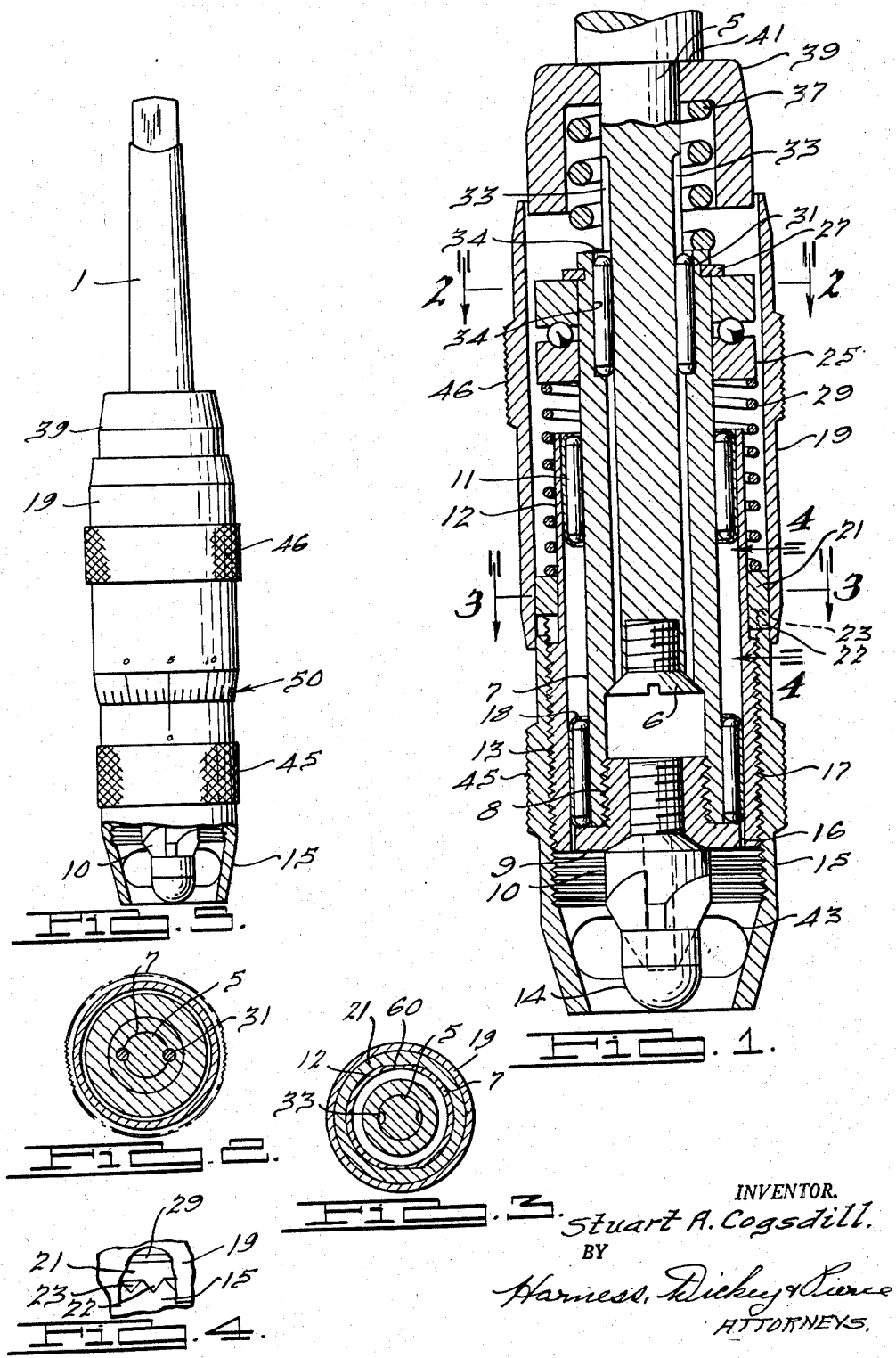
INVENTOR.
Stuart A. Cogsdill.
BY
Harness, Dickey & Pierce
ATTORNEYS.

United States Patent Office 2,905,030
Patented Sept. 22, 1959

2,905,030

MICRO-LIMIT COUNTERSINK DRIVE WITH OVERRIDE

Stuart A. Cogsdill, Orchard Lake, Mich., assignor, by mesne assignments, to Cogsdill Tool Products, Inc., Oak Park, Mich., a corporation of Michigan Application February 21, 1957, Serial No. 641,510

7 Claims. (Cl. 77—73.5)

This invention relates to micro-limit countersink devices and particularly to a device having an overriding feature which absorbs the impact when the advancing portion of the device exceeds the predetermined depth limit.

The countersink device of the present invention embodies an overriding feature in addition to providing an accurate, measurable adjustment of countersink depth. This overriding feature has proved to be of great value since it prevents damage to the machine, tool or workpiece in the event the arbor of the machine continues to advance the device beyond the depth to be countersunk. This has been of particular significance since it alleviates the troublesome problem created by the inaccurate setup of automatic machinery which, as a practical matter, is of frequent occurrence. In the event an automatic machine is erroneously set to advance the device slightly beyond the depth to be countersunk, or if the tool thereof should strike a shoulder or blind hole, the overriding feature permits relative longitudinal movement between the driving spindle and the tool to avoid the destructive pressure which otherwise would be applied. This not only eliminates damage to the elements involved but provides collateral savings in time and money by eliminating the down time of the machine which would otherwise result.

The drive is comprised of a driving spindle having a spindle housing cooperatively mounted on the lower end thereof so as to permit limited relative longitudinal movement and prevent relative rotation therebetween. A tool is mounted on the lower end of the spindle housing in spaced relation with the lower end of the driving spindle. A tubular sleeve assembly extends over the tool and spindle housing and is cooperatively mounted on the spindle housing so as to permit limited relative longitudinal movement and rotation therebetween. A light-duty spring engages the sleeve assembly and a thrust bearing mounted on the upper end of the spindle housing to maintain them in what may be called the retracted position. When the drive is advanced against a workpiece, the sleeve assembly abuts therewith while the spindle and spindle housing continue to advance until the thrust bearing on the spindle housing makes contact with a portion of the sleeve assembly to end relative movement therebetween. This constitutes the limiting feature of the countersink drive.

A spring of a heavier type than the first said spring surrounds the spindle and is disposed between the upper end of the spindle body housing and a suitable end cap. When the tool is adjusted, the spindle and spindle housing will advance together until the predetermined depth limit is reached. At this point the second spring will absorb any further advancement by permitting a limited relative movement between the spindle housing and the spindle shaft itself.

Accordingly, the main object of the invention is to provide a limiting countersink drive having an overriding feature which permits relative movement between the spindle and its housing to absorb any additional movement which may occur after the depth limit has been reached.

Another object of the invention is to provide a limiting countersink drive wherein minute adjustments of the depth of countersink may be made.

A further object of the invention is to provide a limiting countersunk drive with a micrometer type scale for indicating the exact depth at which the tool is set.

Other objects and features of novelty of the invention will become apparent when referring, for a better understanding of the invention, to the following description taken in conjunction with the accompanying drawing, wherein:

Figure 1 is a vertical sectional view of a limiting countersink device embodying features of the present invention;

Fig. 2 is a reduced sectional view of the structure illustrated in Fig. 1, taken on the line 2—2 thereof;

Fig. 3 is a reduced sectional view of the structure illustrated in Fig. 1, taken on the line 3—3 thereof;

Fig. 4 is a broken view of the structure illustrated in Fig. 1, as viewed from the point 4 thereof; and Fig. 5 is a reduced overall view in elevation of the countersink device with the lower end broken away.

The countersink device of the present invention embodies a spindle 5 having a standard shank 1 for mounting the drive on the spindle of the machine. The lower end of the spindle has a threaded aperture to receive the thread of a screw, 6, the head of which functions as a stop collar. Spindle housing 7 is mounted about the spindle 5 and has an internal thread 8 at its lower end for receiving a threaded adapter 9 which supports the countersinking tool 10 in spaced relation to the head of the screw 6. Needle bearings 11 at each end of a tubular sleeve 12 mount the sleeve upon spindle housing 7 for axial movement thereon. The needle bearings 11 have their outer races 18 press fit within tubular sleeve 12 at the upper and lower ends thereof and directly engage the housing 7. The tubular sleeve 12 has external threads 13 on the lower end on which a stop collar 15 is adjustably threaded. An outer sleeve 19 has its lower end extending over the upper end of sleeve 15 and has an internal ring 21 secured at the lower end in sliding engagement with the sleeve 12. The ring has a downwardly projecting V-shaped tooth 22 on its lower face and two flat faces 60 on opposite sides which mate with a pair of flat faces on the upper half of the tubular sleeve 12 to prevent rotation therebetween as clearly illustrated in Fig. 3. The collar 15 has angular serrations 23 on the upper end which receive the mating angular tooth 22 of the ring 21 as illustrated in Fig. 4. A ball thrust bearing 25 is mounted on the upper end of spindle housing 7 and is retained against movement therefrom by a locking ring 27. A light-duty spring 29 is disposed between the thrust bearing 25 and inner ring 21 to provide a bias for retaining the tooth 22 in engagement with a serration 23. The shoulder 16 on the adapter 9 is engaged by the race 18 at the lower end of the sleeve 12 and retains the sleeve on the housing 7.

The spindle 5 is maintained in a non-rotatable relation with spindle housing 7 by keys 31 which are disposed in the slots 33 and 34 in the spindle and spindle housing respectively as clearly illustrated in Figs. 1 and 2. A heavy-duty spring 37 is disposed between the upper edge of spindle housing 7 and an end cap 39, which is mounted on spindle 5 and abuts a shoulder 41 of the shank 1. The cap 39 extends over spring 37 and into the upper end of the sleeve 19 to provide a finished appearance as is evident from Fig. 1. A plurality of slots 43 is provided through the wall of collar 15 near the bottom thereof through which the hole to be countersunk may be viewed.

Shouldered portions 45 and 46 may be knurled on the sleeves 15 and 19 to facilitate adjustment therebetween. The sleeve 19 is raised to disengage the tooth 22 from the serration 23 to permit the sleeve 15 to be rotated to a desired micrometer adjustment in thousands as indicated by the scale 50 on the lower end of the sleeve 19.

In operation the drive assembly is advanced until collar 15 is in abutting relation with the workpiece and the pilot end 14 of the tool 10 is inserted into the aperture to be countersunk. Further advancement causes the tool 10 to move relative to collar 15 and the tubular sleeve 12 against the action of the spring 29 until the lower surface of the thrust bearing 25 contacts the upper end of sleeve 12. At this point the desired depth to be countersunk has been reached and relative movement between the spindle housing 7 and the sleeve 15 will end. Further advancement will be absorbed by the heavy-duty spring 37 which permits relative movement between the spindle 5 and the spindle housing 7, thus constituting the overriding feature of the present invention.

To adjust the depth of the countersink, the sleeve 19 is moved vertically against the action of spring 29 to disengage the tooth 22 from the serration 23 on the sleeve 15. The sleeve 15 may then be rotated relative to sleeve 12 on the threads 13 thereof to extend or retract the sleeve 15 an amount desired. The sleeve 19 may then be released to be urged downwardly over the sleeve 15 by the spring 29 with a tooth 22 engaged with a serration 23 on sleeve 15 to lock the two sleeves together and prevent relative rotation therebetween. The exact position of the sleeve 15 relative to the tool 10 is indicated by the micrometer scale 50 as shown in Fig. 5.

There are 100 serrations on the upper end of the sleeve 15 when the internal thread 17 has a lead of one-tenth of an inch. The same relationship obtains if the lead of the thread is .025 of an inch and 25 serrations employed on the sleeve 15. In either of the examples given, the advancement of the tooth 22 from one serration 23 to another moves the sleeve 15 axially one-thousandth of an inch relative to the sleeve 12. Any relationship may be set up between the lead of the thread 17 and the number of the serrations to obtain the one-thousandths of an inch advancement for each serration or any other degree of advancement desired.

What is claimed is:

1. A countersink device including, in combination, a rotatable and reciprocable spindle, a housing on said spindle for rotation therewith and reciprocation relative thereto, a first sleeve about said housing movable in reciprocation and rotation relative thereto, a second sleeve threaded on said first sleeve for adjustment thereon, and locking means preventing the relative rotation between said sleeves on said thread.

2. A countersink device including, in combination, a rotatable and reciprocable spindle, a housing on said spindle for rotation therewith and reciprocation relative thereto, a first sleeve about said housing movable in reciprocation and rotation relative thereto, a second sleeve threaded on said first sleeve for adjustment thereon, locking means preventing the relative rotation between said sleeves on said thread, said locking means embodying a plurality of notches on said second sleeve, and a third sleeve having a tooth engageable with one of said notches.

3. A countersink device including, in combination, a rotatable and reciprocable spindle, a housing on said spindle for rotation therewith and reciprocation relative thereto, a first sleeve about said housing movable in reciprocation and rotation relative thereto, a second sleeve threaded on said first sleeve for adjustment thereon, locking means preventing the relative rotation between said sleeves on said thread, a thrust bearing on said spindle housing, and a spring between said spindle housing and said locking means, the engagement of said thrust bearing with the upper end of said first sleeve limiting the degree of advancement of said tool.

4. A countersink device including, in combination, a rotatable and reciprocable spindle, a housing on said spindle for rotation therewith and reciprocation relative thereto, a first sleeve about said housing movable in reciprocation and rotation relative thereto, a second sleeve threaded on said first sleeve for adjustment thereon, locking means preventing the relative rotation between said sleeves on said thread, a thrust bearing on said spindle housing, a spring between said spindle housing and said locking means, the engagement of said thrust bearing with the upper end of said first sleeve limiting the degree of advancement of said tool, and a spring between said housing and spindle of greater strength than said first spring which permits the spindle to move relative to the housing after the advancement of the tool has been stopped by the engagement of said thrust bearing with said first sleeve.

5. In a countersink device, a spindle, a housing on said spindle rotatable therewith and reciprocable thereon, a sleeve on said housing rotatable thereon and movable in reciprocation relative thereto, a thrust element on said housing, a spring between said thrust element and said sleeve which urge the sleeve and thrust element apart, a countersink tool on said housing, and a second spring between said housing and said spindle of greater strength than said first spring to maintain the spindle and housing in extended position as the tool is advanced until the thrust element strikes the upper part of the sleeve after which the spindle may advance relative to the housing against the pressure of said second spring.

6. A device for attachment to a machine tool including, in combination, a spindle having a shank on one end thereof adapted to be releasably supported in a rotatable and a reciprocable arbor of a machine tool, a tool supporting member mounted on said spindle for rotation therewith and for limited reciprocation relative thereto, stop means mounted on said member for limiting the advancement of said member relative to a workpiece to be machined, and spring means between said spindle and member for resiliently resisting movement therebetween in one direction whereby the spindle will continue to advance relative to said member after said stop means and member can no longer be advanced.

7. A device for a machine tool including, in combination, a spindle having a shank on the upper end thereof adapted to be releasably supported in an arbor of a machine tool for rotation and reciprocation, a tool supporting member mounted over the lower end of said spindle for rotation therewith and reciprocation relative thereto, means for limiting the relative reciprocal movement between said spindle and member, stop means mounted over the lower end of said member for rotation and reciprocation relative thereto, means for limiting the relative reciprocation between said member and stop means, a first spring means for resiliently resisting the upward movement of said stop means relative to said member, and a second spring means for resiliently resisting the upward movement of said member relative to said spindle.

References Cited in the file of this patent

UNITED STATES PATENTS

| 1,732,558 | Johnson | Oct. 22, 1929 |
| 2,126,175 | Dalcher | Aug. 9, 1938 |
| 2,409,377 | Miller | Oct. 15, 1946 |
| 2,710,549 | Cogsdill | June 14, 1955 |